C. C. KNAUSS.
HOT AIR FURNACE.
APPLICATION FILED JULY 9, 1908.
916,329.
Patented Mar. 23, 1909.
3 SHEETS—SHEET 1.
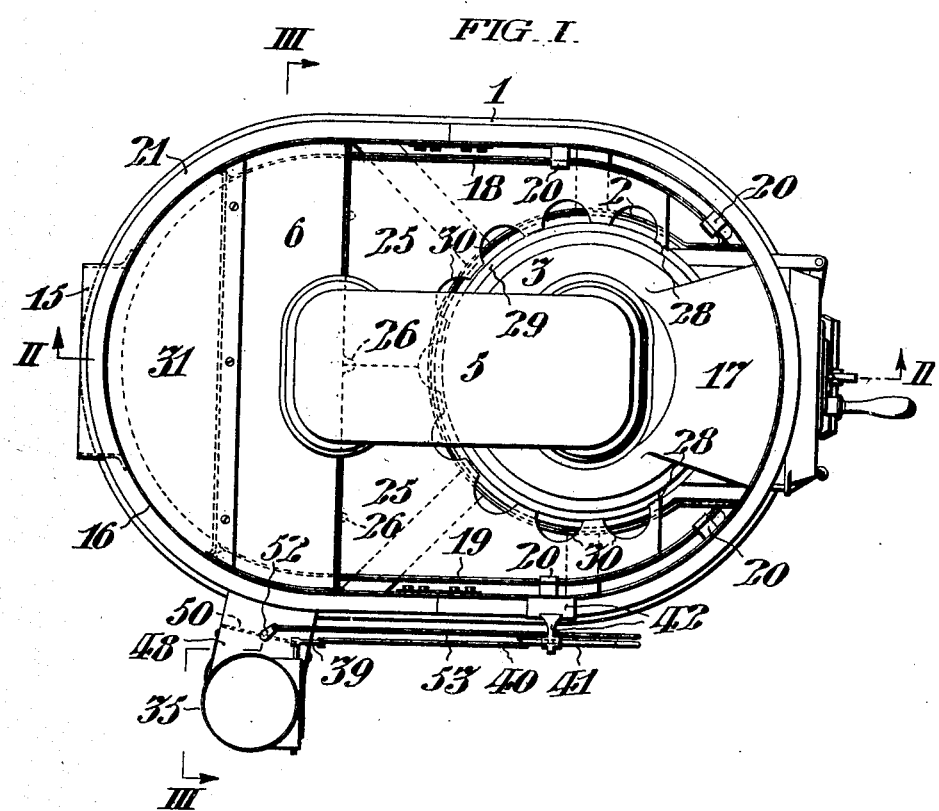
FIG. I.
WITNESSES:
INVENTOR:
CHARLES C. KNAUSS,

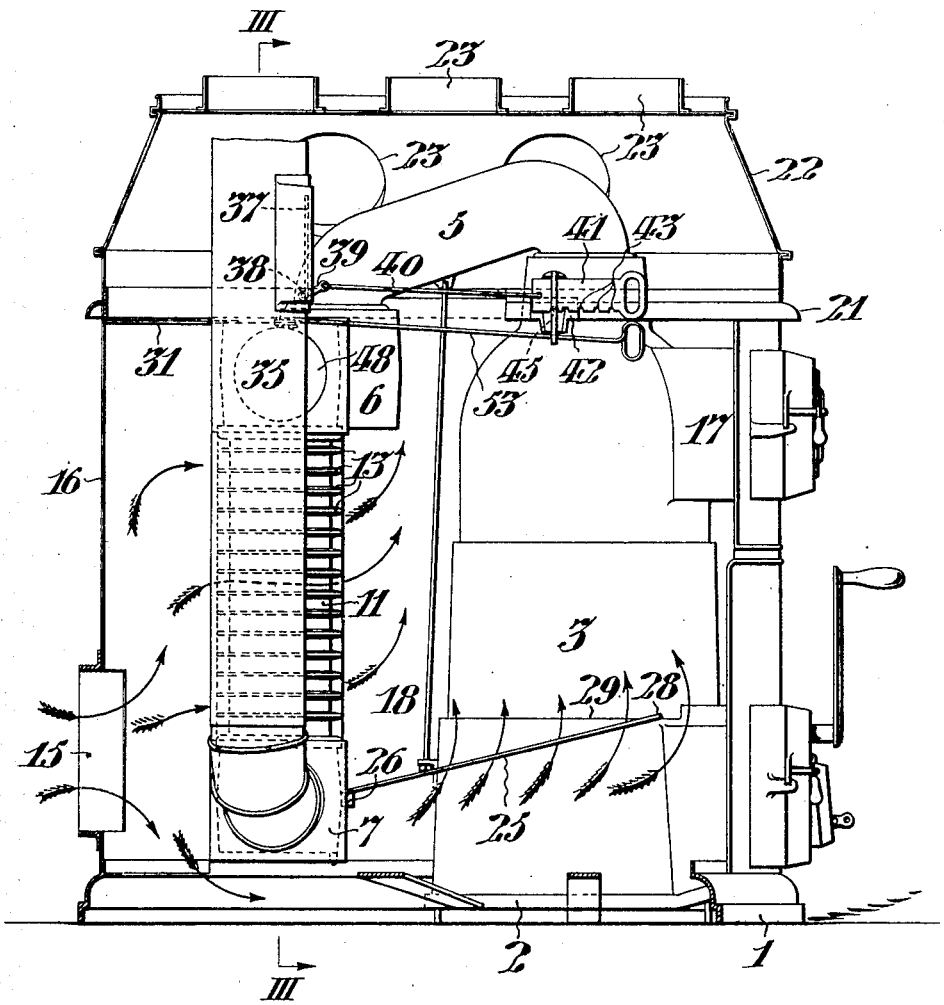

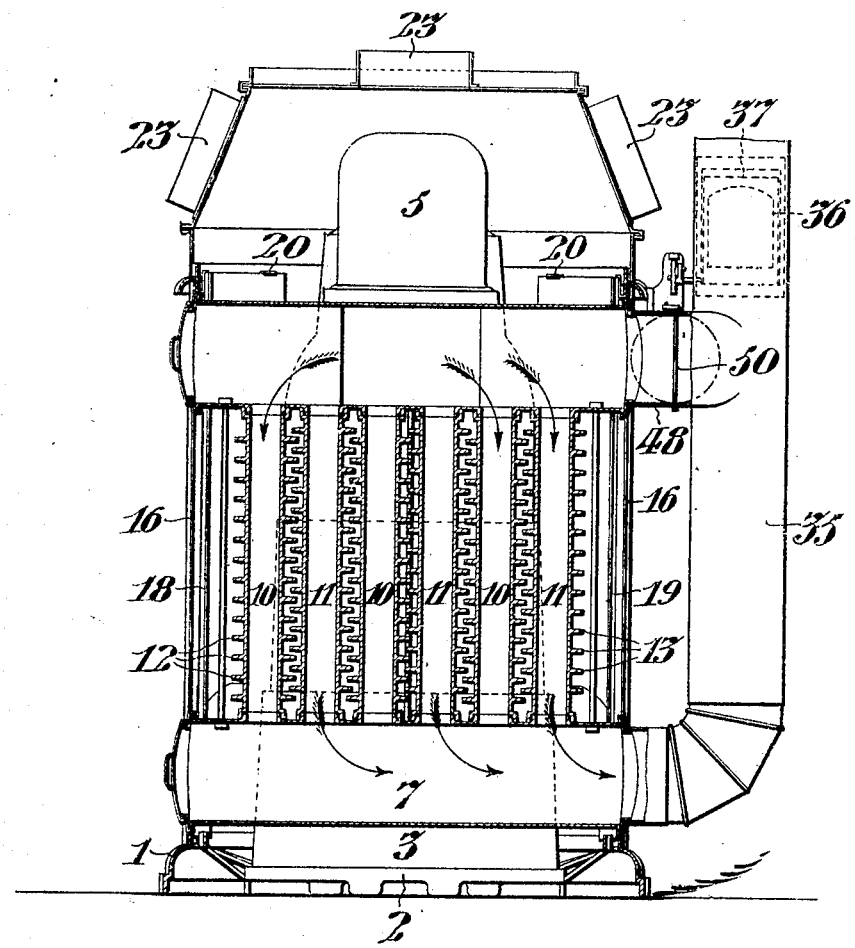

UNITED STATES PATENT OFFICE.

CHARLES C. KNAUSS, OF PHILADELPHIA, PENNSYLVANIA, ASSIGNOR TO TUBULAR HEATING & VENTILATING COMPANY, OF PHILADELPHIA, PENNSYLVANIA, A CORPORATION OF PENNSYLVANIA.

HOT-AIR FURNACE.

No. 916,329.  Specification of Letters Patent.  Patented March 23, 1909.

Application filed July 9, 1908. Serial No. 442,763.

*To all whom it may concern:*

Be it known that I, CHARLES C. KNAUSS, of Philadelphia, in the State of Pennsylvania, have invented a certain new and useful Improvement in Hot-Air Furnaces, whereof the following is a specification, reference being had to the accompanying drawings.

My invention relates to furnaces of the type wherein the products of combustion are conveyed from the fire pot through manifold flues within a casing through which the air is directed to be heated, and, my improvement is particularly addressed to the means for controlling the direction of the air and products of combustion with respect to said fire pot and flues. In the form of my invention hereinafter described, said flues are cast metal tubes provided with radiating flanges and connected in common with upper and lower headers, through which the products of combustion may be selectively directed, and, means are provided to direct cold air beneath the lower header and distribute the same over the surface of the fire pot so as to insure the direct absorption of heat from the latter.

My invention includes the various novel features of construction and arrangement hereinafter more definitely specified and claimed.

In the drawings; Figure I, is a plan view of a furnace conveniently embodying my improvement and having its casing cap removed for convenience of illustration. Fig. II, is a sectional view of the furnace casing, taken on the line II, II, in Fig. I, but showing the fire pot, diaphragms and flues in elevation. Fig. III, is a transverse vertical sectional view, taken on the line III, III, in Figs. I and II.

In said figures, the furnace base ring 1, comprises the bed frame 2, arranged to support the fire pot 3, having the main flue 5, leading to the manifold flues comprising the upper header 6, and lower header 7, connected by the cast metal flue tubes 10 and 11, having the radiating flanges 12 and 13, respectively. Said manifold is conveniently supported at its ends by the base ring 1, thereby affording sufficient space beneath the lower header 7, for the free passage of fresh air entering the inlet 15, in the casing 16, which incloses said manifold and fire pot, and which is also supported upon the base ring 1, as best shown in Fig. II.

Within the casing 16, and extending parallel therewith from the manifold to the fuel inlet 17, are the heat shields 18 and 19, supported by the base ring 1, at the bottom and held at the top by the lugs 20, on the flanged ring 21, which rests upon the upper edge of said casing 16, and supports the distributing cap 22, having the hot air outlets 23, which may be connected with suitable distributing pipes.

The air passing beneath the lower header 7, is directed by the deflecting diaphragm 25, forwardly and around the fire pot 3, to absorb the heat radiated therefrom. As shown in Fig. I, said diaphragm may be conveniently formed in two sections, and extends from said header 7, (where it is supported by the lugs 26) forwardly toward the front of the fire pot 3, where its projecting inner corners 28, rest upon the ledge 29. As shown in Fig. I, the edge of said diaphragm 25, which engages the fire pot 3, is concavely recessed to form a series of apertures 30, through which the cold air deflected by the diaphragm 25, flows around said fire pot in direct contact therewith, thus utilizing all of the heat radiated therefrom, in addition to the heat radiated by the manifold and absorbed by the air currents passing through the inlet 15, and between the flanged tubes 10 and 11, of said manifold as indicated by the arrows in Fig. II. The air entering the inlet 15, is prevented from ascending directly into the cap 22, by the segmental diaphragm 31, extending horizontally from the top of the upper header 6, to the casing 16, as shown in Figs. I and II.

The flue pipe 35, extends upwardly from the lower header 7, and is provided with the usual air check inlet 36, which is controlled by the damper 37, pivoted at 38, and provided with the lever arm 39, connected by the link 40, with the regulating slide-block 41. Said slide-block 41, is slidably supported in the bracket 42, and is provided with the notches 43, arranged to engage the projection 45, on said bracket in any position in which said damper 37, may be set. Said smoke pipe 35, is also connected with the header 6, by the branch pipe 48, which is provided with the damper 50, having the lever arm 52, connected with the shifter rod 53, whose free end is slidably supported in the bracket 42, as best shown in Fig. II.

It is to be noted that when the damper 50, is opened as indicated in dot and dash lines in Fig. III, the products of combustion pass from the fire pot 3, through the main flue 5, to the upper header 6, and thence directly through the branch pipe 48, to the smoke pipe 35, thus facilitating the rapid combustion of the fuel. However, when the damper 50, is closed, as indicated in full lines in Fig. III, the products of combustion are compelled to pass down through the tubes 10 and 11, into the header 7, of the manifold, as indicated by the arrows in said figure, and are discharged thence through the smoke pipe 35, after radiating their heat to the air in the casing 16.

As shown in Fig. III, the flanges 12, and 13, are disposed on alternate tubes in such staggered relation that they are interposed and overlapped, so that a maximum number of tubes and extent of radiating surface may be employed.

I do not desire to limit myself to the precise details of construction and arrangement herein set forth as it is obvious that various modifications may be made therein without departing from the essential features of my invention as defined in the appended claims.

I claim:—

1. In a furnace, the combination with a fire pot; of a manifold arranged to convey gases of combustion from said fire pot and comprising two opposed headers connected by flue tubes having radiating flanges; a smoke pipe connected with both of said headers; a damper in said smoke pipe local to one of said headers, controlling the passage through the latter; a casing inclosing said fire pot and manifold, and having an air inlet local to said manifold; a diaphragm extending from said manifold to the fire pot and arranged to direct air from under said manifold, around the fire pot, substantially as set forth.

2. In a furnace, the combination with a fire pot having a fuel inlet; of a manifold arranged to direct the gases of combustion from said fire pot; a casing, having an air inlet and distributing outlets, surrounding said fire pot and manifold; heat shields extending within said casing in parallel relation therewith, from said manifold forward to the fuel inlet of said fire pot; a diaphragm, extending from said manifold between said shields, forwardly to the front of said fire pot, and having a concavely scalloped edge adjacent to said fire pot arranged to direct air, around the surface of said fire pot, from beneath said manifold, substantially as set forth.

3. In a furnace, the combination with a fire pot having a ledge; of a manifold, comprising opposed headers connected by a series of flue tubes, and arranged to permit air to pass around and beneath it; a casing surrounding said fire pot and manifold, and having an air inlet and suitable distributing outlets; lugs on one of said headers; and a diaphragm supported at one edge by said lugs and extending forwardly and supported at its forward edge by inwardly projecting corners resting upon the ledge on said fire pot arranged to direct the air currents entering said inlet beneath said manifold, forwardly into contact with said fire pot, substantially as set forth.

4. In a furnace, having a cold air inlet and hot air outlets, the combination with a fire pot; of a flue manifold, arranged to convey the gases of combustion from said fire pot, comprising opposed headers connected by flue tubes having radiating flanges; a smoke pipe connected with both of said headers; means whereby said gases of combustion may be selectively directed from said fire pot to said smoke pipe, through one of said headers or through both of said headers and the tubes connecting them; a diaphragm extending from one of said headers and embracing said fire pot, arranged to direct a portion of the air entering said air inlet forwardly to said fire pot, substantially as set forth.

5. In a furnace having an air inlet and outlet, the combination with a fire pot; of a flue manifold through which the gases of combustion pass; an inclined plane diaphragm extending from said manifold and terminating at the front of said fire pot arranged to direct a portion of the air entering said inlet into contact with said fire pot; and, means arranged to direct air from said inlet aside from said fire pot, substantially as set forth.

6. In a furnace, the combination with a fire pot; of a flue manifold arranged to convey the gases of combustion from said fire pot; a casing having an air inlet and outlet, and inclosing said fire pot and manifold; and a plane diaphragm extending forwardly from said manifold, and embracing said fire pot in inclined relation therewith, and arranged to direct fresh air from said inlet into contact with said fire pot, substantially as set forth.

7. In a furnace, the combination with a fire pot; of a manifold arranged to convey the gases of combustion from said fire pot, and comprising two opposed headers connected by tubes; a smoke pipe connected with both of said headers; a damper in said smoke pipe, local to one of said headers, controlling the passages through the latter; a casing inclosing said fire pot and manifold, and having an air inlet local to said manifold, and air outlets distinct from said inlet; and, a diaphragm extending from said manifold to the fire pot, arranged to direct air from under said manifold, around the fire pot, substantially as set forth.

8. In a furnace, the combination with a fire pot having a fuel inlet; of a manifold arranged to direct the gases of combustion from said fire pot; a casing having an air inlet and distributing outlets, surrounding said fire pot and manifold; heat shields extending within said casing from said manifold, forward to the fuel inlet of said fire pot; a diaphragm extending from said manifold between said shields, forward to the front of said fire pot, and comprising a recessed edge adjacent to said fire pot, arranged to direct air around the surface of said fire pot, from beneath said manifold, substantially as set forth.

9. In a furnace having a cold air inlet and hot air outlets; the combination with a fire pot; of a flue manifold, arranged to convey the gases of combustion from said fire pot, and comprising opposed headers connected by tubes; a smoke pipe connected with both of said headers; means whereby said gases of combustion may be selectively directed from said fire pot to said smoke pipe through one of said headers, or through both of said headers, and the tubes connecting them; a diaphragm extending in a plane from one of said headers and embracing said fire pot in inclined relation therewith; arranged to direct a portion of the air entering said inlet, forward to said fire pot, substantially as set forth.

In testimony whereof I have hereunto signed my name at Philadelphia, Pennsylvania, this second day of July 1908.

CHARLES C. KNAUSS.

Witnesses:
ARTHUR E. PAIGE,
BEULAH M. TEITSWORTH.